(12) United States Patent
Blomstedt et al.

(10) Patent No.: US 8,832,023 B2
(45) Date of Patent: Sep. 9, 2014

(54) SYSTEM FOR MANAGING DISTRIBUTED ASSETS AND METADATA

(75) Inventors: Linda C. Blomstedt, Bristol, NH (US); Michael S. Schwartz, Belmont, MA (US); Charles E. Parry, Andover, MA (US); Anne C. Rourke, Lynnfield, MA (US); Louis J. Sakey, Woburn, MA (US); Wendy Swanbeck, North Chelmsford, MA (US); James O. Schreckengast, Fort Collins, CO (US)

(73) Assignee: Apple Inc., Cupertino, CA (US)

( * ) Notice: Subject to any disclaimer, the term of this patent is extended or adjusted under 35 U.S.C. 154(b) by 909 days.

(21) Appl. No.: 12/362,762

(22) Filed: Jan. 30, 2009

(65) Prior Publication Data

US 2010/0198888 A1     Aug. 5, 2010

(51) Int. Cl.
*G06F 17/30* (2006.01)
*G06F 7/00* (2006.01)

(52) U.S. Cl.
CPC .............................. *G06F 17/30017* (2013.01)
USPC ........................................................ 707/610

(58) Field of Classification Search
CPC ................... H04N 21/6125; H04N 21/23116; H04N 21/278; G06F 17/30194; G06F 17/30902
USPC ........................................................ 707/610
See application file for complete search history.

(56) References Cited

U.S. PATENT DOCUMENTS

| 6,961,463 | B1 | 11/2005 | Loui et al. |
| 7,359,955 | B2 | 4/2008 | Menon et al. |
| 7,539,783 | B2 | 5/2009 | Kochunni et al. |
| 7,567,812 | B2 | 7/2009 | Herrod et al. |
| 2005/0131871 | A1* | 6/2005 | Howard et al. ................ 707/3 |
| 2006/0101064 | A1* | 5/2006 | Strong et al. ............... 707/102 |
| 2006/0235898 | A1 | 10/2006 | Loveland |
| 2008/0140947 | A1* | 6/2008 | Slik et al. ................... 711/154 |
| 2008/0178198 | A1 | 7/2008 | Gauba |
| 2008/0215747 | A1* | 9/2008 | Menon et al. ............... 709/231 |
| 2009/0030952 | A1 | 1/2009 | Donahue et al. |
| 2009/0094247 | A1 | 4/2009 | Fredlund et al. |

FOREIGN PATENT DOCUMENTS

WO     WO 2007/024380 A2     3/2007

OTHER PUBLICATIONS

Androutsellis-Theotokis S et al.: "A Survey of Peer-to-Peer Content Distribution Technologies", ACM Computing Surveys, ACM, New York, NY, US, vol. 36, No. 4, Dec. 1, 2004, pp. 335-371, XP-002412530, ISSN: 0360-0300, the whole document.
Vidal Martins et al.: "Survey of Data Replication in P2P Systems", Internet Citation, Dec. 1, 2006, pp. 1-45, XP-002501325, Retrieved from the Internet: URL:http://hal.inria.fr/docs/00/12/22/82/PDF/Survey_of_data_replication_in_P2P_systems.PDF> [retrieved on Oct. 17, 2008] the whole document.

(Continued)

*Primary Examiner* — Kuen Lu
(74) *Attorney, Agent, or Firm* — Novak Druce Connolly Bove + Quigg LLP (57) ABSTRACT

A system for managing distributed digital assets and related metadata in a network, including several interconnected nodes, each of the interconnected nodes providing accessibility to the distributed digital assets via user controlled stores and caching subsystems such that the management of the assets and related metadata is based on predetermined criteria. Each node includes a caching subsystem, a metadata store, a controller, a user-controlled asset component, and a networking subsystem for communication between each of the nodes. The interconnected nodes provide support for platform operation of client applications.

8 Claims, 7 Drawing Sheets

(56) References Cited

OTHER PUBLICATIONS

De Brum Saccol D. et al.: "Detecting Managing and Querying Replicas and Versions in a Peer-to-Peer Environment", 7th IEEE International Symposium on Cluster Computing and the Grid (CCGRID' 07) IEEE Piscataway, NJ, USA, 2007, pp. 833-838, XP002584320, ISBN: 978-0-7695-2833-5, the whole document.

Ronaldo A. Ferreira et al.: "Randomized Protocols for Duplicate Elimination in Peer-to-Peer Storage Systems", IEEE Transactions on Parallel and Distributed Systems, IEEE Service Center, Los Alamitos, CA, US LNKD-DOI:10.1109/TPDS.2007.351710, vol. 18, No. 5, May 1, 2007, pp. 686-696, XP011179651, ISSN: 1045-9219, abstract, pp. 686-687.

Detection of Mutual Inconsistency in Distributed Systems, Parker et. al., IEEE Transactions on Software Engineering, vol. SE-9, No. 3, May 1983.

SOAP Version 1.2. Part 1: Massaging Framework (Second Edition) W3C Recommendation Apr. 27, 2007 http://www.w3.org/TR/soap12-part/.

* cited by examiner

SYSTEM FOR MANAGING DISTRIBUTED ASSETS AND METADATA

FIELD OF THE INVENTION

The present invention relates to the architecture, services, and methods for managing data among multiple devices, servers and systems. Specifically, the present invention relates to providing a logically unified and aggregated view of a user's data-related assets, including metadata from any system node or device.

BACKGROUND OF THE INVENTION

Data-related assets include images, videos, and music files which are created and downloaded to personal computer (PC) storage for personal enjoyment. In general, today's data-related assets are often in a digital format (i.e., "digital assets") even when they don't originate as such. Typically, these digital assets are accessed only when needed for viewing, listening or playing. Various devices and internet services provide and utilize these assets, including Personal Digital Assistants (PDAs), digital cameras, personal computers (PCs), media servers, terminals and web sites. Collections of assets stored on these devices or service providers are generally loosely coupled or not coupled at all and current synchronization processes occur typically between two devices, for instance a media player and a PC.

Many existing solutions provide an aggregated view of a distributed digital asset collection by replicating each asset (i.e., by duplicating every data file associated with the asset) on every node. Syncplicity, Sharpcast's SugarSync and Microsoft's Live Mesh are examples of current market offerings using this replicating methodology. One shortcoming of such systems is their low storage efficiency. Additional storage capacity is required on every node as new assets are added to other nodes, regardless of the node's need for the stored asset.

Another shortcoming of the above systems, which replicate new assets on every node, is a pronounced user experience impact while the user waits for an asset to be uploaded. Since many common workflows require the asset interest to be uploaded (e.g. sharing or printing), the user experience is substantially delayed while the upload operation is completed.

Yet another shortcoming of conventional systems relates to the ability to restrict access to a previously shared asset. Once a shared asset has been shared with another user the asset is also replicated on the recipient's node. Most existing solutions do not allow the initial sharer to delete the replica when a new, identical replica of the asset exists on the recipient's node or computer.

Other conventional solutions provide an aggregated view of a distributed digital asset collection by enabling each node that stores assets to broadcast to a requesting node a version of the requested asset. One example is Orb Systems. A client application, installed on every point of access node, streams the requested assets on to other nodes per requested requirements (e.g., resolution criteria). A shortcoming of this type of system is the inability to access when a point of access is not connected to the system (i.e., offline status). Furthermore, an offline node is virtually inoperable providing only value related to the assets stored locally. Yet, another limitation is that if the node that is storing an asset is offline, none of the other nodes in the other system will be aware of the existence of the stored asset.

Another shortcoming of existing systems is their limited ability to recognize that a newly introduced asset to the collection may already be present; therefore, the system commonly produces an unnecessary duplicate in the collection, which impacts the system by requiring additional resources to operate (e.g., storage space or processing time). It also impacts the user, who might not be aware that the system contains multiple copies of the same asset.

Finally, another shortcoming of conventional aggregated views of a distributed digital asset collection is that the information created by the owner while organizing her assets locally (e.g. Windows folder system to organize pictures) may be either destroyed or ignored.

Accordingly, there remains a need in the art to overcome the deficiencies and limitations associated with conventional distributed digital asset collection systems that exist today.

SUMMARY OF THE INVENTION

The aforementioned need is met by the present invention that describes a system for managing distributed digital assets and related metadata in a network, including several interconnected nodes, each of the interconnected nodes providing accessibility to the distributed digital assets via user controlled stores and caching subsystems, such that the management of the assets and related metadata is based on predetermined criteria Each interconnected node includes a caching subsystem, a metadata store, a controller, a user-controlled asset storage component, and a networking subsystem for communication between each of the nodes. The interconnected nodes provide support for platform operation of client applications.

The present invention further provides a method for determining duplicate data assets by determining an added asset at a monitored disconnected node, and evaluating whether the added asset is a duplicate of an existing asset. Where the added asset is immediately evaluated as a duplicate, it is categorized as an additional replica. Where no duplicate asset is found at the disconnected node, then, when the node reconnects, all other known user nodes are contacted to determine if a duplicate asset exists at those nodes. If so, that duplicate asset is categorized as an additional replica. Where there is no existence of the added asset at the known user nodes, the added asset is categorized as a new asset.

Yet one other aspect of this invention includes the ability for one user of this system to share an asset with a second user in such a way that the second user is able to see the asset and see changes to the asset and its metadata, and to be able to make changes to the asset and its metadata, if given permission to do so by the owner of the asset.

Accordingly, a method of providing access to data assets between multiple users is disclosed that, includes a step of providing a network for sharing the data assets among at least a first user and a second user. A second step enables an invitation to share the data assets. The invitation is sent from the first user to the second user. A third step enables an acceptance of the invitation by the second user; hence, causing, thereafter, production of sharing metadata that corresponds to shared data assets. Another step sends a copy of the metadata to the second user to enable sharing of the data assets between the first and second users. The final step synchronizes the shared metadata, where the shared metadata has been changed, such that, at a minimum, recent metadata changes are reflected.

DETAILED DESCRIPTION OF THE INVENTION

A distributed digital asset management system in accordance with the present invention is described herein. Distributed digital asset management systems are sometimes referred to as a federated asset management system. The distributed digital asset management system, within the context of the present invention, combines data from different sources in a way which makes it seem to a user of the system as if the data were all stored together. These sources include, for example, personal computers, servers, mobile phones, gaming devices, etc. The data includes digital data, audio data, imaging data, etc. Consequently, within the context of the present invention, 'assets' relate to images, video, music, other audio data and files that are originally digitized or that will be converted to a digital format.

One of several aspects of this invention provides for an aggregated view (across one or many nodes) and access of all media assets owned and shared. All of the digital/media assets owned or shared by a user are aggregated and termed a user's virtual collection. This invention describes a distributed system for managing either all or a selected amount of the user's digital assets and metadata associated with this virtual collection that includes a set of software services that run on various nodes that the user might wish to use or where the user's assets may reside, and which communicate with other nodes.

Figure 1:
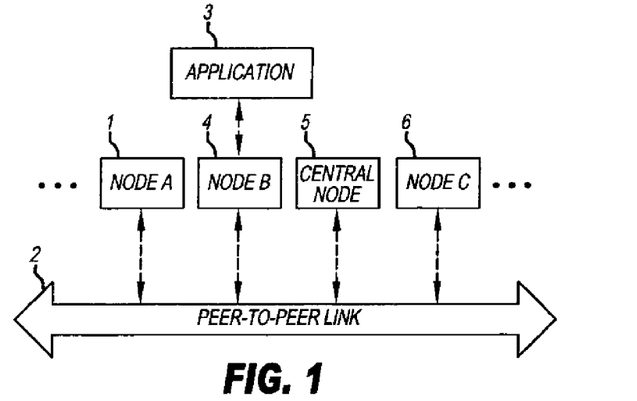
FIG. 1 shows an exemplary full distributed system, according to the present invention, as a set of nodes interconnected by a peer-to-peer network.

An exemplary distributed digital asset management system (hereinafter frequently referenced as "the system"), according to the present invention, includes a set of nodes (1, 4, 5, & 6) as shown in FIG. 1. Nodes 1, 4, 5, & 6 include a software service or set of services running on a computer. This computer can be a workstation belonging to a user, but the nodes might also be a personal digital assistant (PDA) or other networked-enabled device, such as a mobile phone or gaming device. The nodes 1, 4, 5, & 6 communicate with each other over a network using a peer-to-peer link 2. This network will generally be the Internet, but could also contain ad-hoc sub-networks based on other protocols such as Bluetooth™. Some nodes will communicate with application 3. Typical applications allow users (also referred to as members) to view, share, and otherwise manipulate their virtual collection and all of the assets and metadata belonging to the collection, including assets in their virtual collection residing on other nodes. Each node on a given computer supports all of the users who use that computer. Implementations of this distributed system will preferably include a central node 5. Central node 5 resides on a set of network servers. The central node 5 helps different users on the distributed system make initial contact with each other, supports web applications, and supports external services, such as photo-finishing. Central node 5 also can provide caching storage for assets that need guaranteed availability. For most users of this distributed system, interaction and communication is primarily with and between non-central (edge) nodes.

Figure 2:
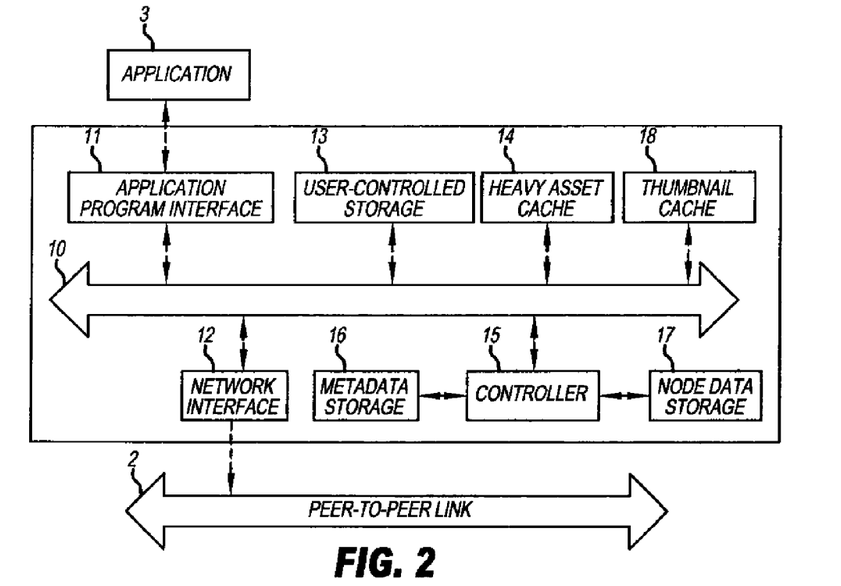
FIG. 2 shows the components of a single node.

The internal structure of an exemplary node is shown in FIG. 2. A typical node includes a number of components that communicate by passing messages 10 to each other. On some systems the messages pass over asynchronous queues implemented by Microsoft's MSMQ or similar software, but the components can also pass messages directly. An Application Program Interface (API) component 11 gives user applications access to the user's virtual collection and corresponding information about it. A network interface 12 allows each node to communicate with all the other nodes by sending and receiving messages. A user controlled memory/storage component 13 manages user-controlled assets. Typically, the assets managed by the user-controlled memory/storage component 13 include files residing on the computer where the node is located. However, it is also possible for a user-controlled memory/storage component 13 to manage assets at remote network sites such as Flickr™. The heavy asset cache 14 includes assets and other files being stored on this node temporarily. The controller 15 runs the workflows which perform the tasks done by the node. These workflows are controlled by workflow descriptions and policies stored in a node data base 17. The nodes can be independently configured by changing these workflow descriptions and policies. For example a PDA would have very different workflows than a workstation. The workflows and policies used by the controller include the policies which govern the management of the heavy asset cache.

The metadata store 16 contains metadata corresponding to the assets in the user's collection. In general, the metadata store 16 for a given user will contain metadata for all of the assets in that user's collection. Thumbnails (e.g., images and audio clips) corresponding to assets are also considered to be metadata within this distributed system. The thumbnails are stored in a thumbnail cache 18. Other embodiments of this invention could store the thumbnails in the metadata store 16. The amount of metadata stored on a given node will be sufficient so that a user can browse and do some activities with the entire collection even if the computer is isolated from the network. The exact specification of which asset metadata is stored on each node is determined by criteria stored in the node data store 17.

The network interface 12 is responsible for managing the peer-to-peer connection between nodes. It transfers messages and files between nodes and discovers which nodes are online. The network interface 12 is composed of two parts. One part, called the Network Talker/Listener receives messages from the rest of the node. Those messages are specific to the system and are in a format which is independent of transport. Those messages are addressed to a specific user on a specific node. The identity of the node is specified in a way which does not make reference to specific network addresses. The second part, are interfaces used by the Talker/Listener to send and receive messages. Transport interfaces used by the Network Talker/Listener encapsulate all information about various transports available to the system. The most preferable mechanism for communicating between nodes transmits data between home systems which are separated by routers and firewalls. Ideally, the network interface 12 should do this without requiring users to open holes in their routers or firewalls. For this reason, the method used for transporting data and metadata between nodes used most generally in one embodiment of this system uses a software package developed by Google called libjingle. This package combines a chat mechanism for sending messages between computers with a peer-to-peer file transmission mechanism which can pass data through consumer network routers. Other well-known methods for establishing peer-to-peer connections between computers can also be used with this system. In addition, nodes located within a single home network can communicate using simple TCP/IP based protocols which do not require the use of an external chat server.

A user accesses this system through applications, which provide a graphical user interface (i.e., GUI) to allow the user to view/edit the collection. These applications use the services provided by a local asset management node to get access to a distributed collection belonging to a user without requiring the application to know any details about the location of the asset or its metadata. The application uses a library that is distributed and loaded as part of the system's application. This library communicates with the system's application program interface (API) component 11 on the local node. The library communicates by sending messages to the API component 11 using standard inter-process communications methods. The system API component 11 responds to messages from the application by communicating with the other components of the system node.

An application can use the system API to read and write system metadata (e.g., member information, collection information, and asset information). The application can also subscribe to notifications for both status and error information and for notification when changes are made to the collection outside the application. The application uses system services to access the heavy assets (i.e. the fill resolution asset files) in heavy asset cache 14. Accessing the heavy assets can be done by requesting a local path for the asset or by opening a stream to the asset. System Services will provide a usable local path or stream, regardless of the actual storage location of the heavy asset.

On the central node 5 the API needs to be appropriate to a network environment. The most commonly used protocols for internet API's are the simple object access protocol (SOAP) and representational state transfer (REST) protocols, each of which involve transmitting the API parameters and responses inside of HTTP packets. The API processor on the central node 5 responds to REST commands. A request for a heavy asset through this API moves a copy of the asset to the central heavy asset cache 14, and returns a proxy URL which can be used to retrieve the asset from the central heavy asset cache 14.

System metadata, in accordance with the present invention, includes information about the assets in the collection as well as user information (e.g., passwords, file names, video previews, asset creation dates, and user-provided tags) and the state/status of system operations (e.g., file copy, file sharing). The asset information includes information extracted from the file such as Exif tags, information added by users such as captions, and information extracted from the asset content using image intelligence operations. The metadata for an asset also includes a thumbnail for the asset, for example, a small image extracted from the asset which allows a user to visually identify the asset easily. The metadata for an asset also contains references to all known copies of that asset as well as references to all other assets which were made from that asset. If the system knows which asset a given asset was derived from, the asset metadata also includes a reference to the original asset from which the asset was derived. Access control information for an asset is also part of the metadata for the asset. System metadata is organized as subjects with properties, with both the subjects and properties being themselves pieces of metadata.

Metadata generated on one node is communicated to other nodes through the process of node synchronization. In the context of the present invention, a given system node will not have each and every piece of metadata associated with the collections of the users who use that node. Each node will, however, store the metadata it considers to be "access-critical". Access-critical metadata is the metadata needed to allow a local application to function when the node is off-line. Each node can have a different notion of what is "Access-Critical Metadata", for example, a cell phone may only keep a list of asset IDs. A PC may have a significantly larger set including asset ID, dates, captions, descriptions, etc. As part of the node synchronization process, each node communicates the specific set of metadata it considers "access-critical" to other nodes. There can also be a separate metadata store 16 that holds metadata that only relates to the local node. The separate metadata store 16 holds items that relate to the local state of things, for example.

Collection metadata can include references as well as values. For example, a piece of asset metadata is a property of the asset. The various copies of an asset located on different nodes are also properties of an asset and references to those copies are stored in the metadata store. The system stores these references as system Universal Resource Identifiers (URI's). In addition to identifying a system resource, a system URI provides a means of locating the resource by describing its primary access mechanism (e.g., its network "location"), so it is also a system Universal Resource Locator (URL). The URL can be used in this way, because it contains a system network Node ID, which is a globally unique identifier (GUID) that uniquely identifies each node and can be interpreted by the network interface component. If a node is asked for metadata or assets that it does not store locally, it can use the system URL to find out which nodes that do have the required data and send messages to those nodes asking for the desired data.

The metadata store 16 can include a variety of database technologies. Much of the collection metadata is stored in databases implementing a Resource Description Framework (RDF). An RDF is the means by which a semantic web provides a common framework that allows data to be shared and reused across application, enterprise, and community boundaries. Additionally, much past and ongoing semantic web work involves "reasoning" about data that is represented using RDF. Sharing and reuse of, as well as reasoning on, metadata are important to the system, hence the use of open interfaces and image intelligence. An additional advantage of RDF over traditional relational databases is the ease with which new kinds of information can be added to the design. However, there are also costs associated with RDF and for certain kinds of data, such as an Exif file, a relational database is a better choice. Therefore, one embodiment of this invention uses a combination of databases. Each type of metadata is associated with a storage type. When the metadata store 16 needs to access a particular type of metadata it looks at its storage mode for that type of metadata to determine which database to go to.

The node controller 15 on a node controls access to system metadata and assets. Its operations are controlled by information about the capabilities of the node stored in the node data store 17. The node controller 15 uses a workflow manager to control much of its processing. There are many workflows that require a series of sending and receiving messages from other system components before the message processing can be considered complete. The workflow manager is responsible for managing all of these workflows. The workflow manager is also responsible for maintaining the state of a workflow between messages by saving parameters describing that state into the node data store 17.

The workflow manager is policy driven. It is the component that has knowledge about the type of node it is operating on and uses this information in setting up and executing workflows consistent with a node's capabilities and requirements. The workflow manager also uses some of the metadata to find assets and metadata that are not stored locally. The workflows themselves are specified by statements in the Business Process Execution Language (BPEL). The node controller 15 stores the BPEL workflow descriptions in the node data store 17 and executes them using an execution engine which is part of the node controller 15. Because the workflows for the node are stored on the node, the workflows can vary from one node to another and can be different on nodes having different levels of capability.

System storage on each node includes all of the assets on that node. The asset storage is managed by asset managers. These asset managers communicate with other components of the system and provide the distributed system with a way of accessing and managing the assets. Each asset manager accepts messages to control or request information on the data it's responsible for. They provide a standard interface between the system and the various types of asset storage which the system can support.

There are three basic types of asset managers corresponding to the types of asset storage:

1) User Asset Managers (UAMs)—UAMs manage various asset files stored on the local computer that are located and organized however the user has chosen to store and organize them. A user who has installed the system software tells it where the local asset files are, but does not need to move the local assets to any particular place or organize them according to any particular hierarchy. The user has complete freedom to add delete or move those files using the local computer file system utilities. For this reason, the storage managed by the UAMs is termed user-controlled storage.

2) Thumbnail Asset Managers (TAMs)—TAMs manage the thumbnail cache, which includes thumbnail files for all the assets in a person's virtual collection. The thumbnail cache on each node is entirely controlled by the system services running on that node.

3) Cache Asset Manager (CAM)—A CAM manages the heavy asset cache, which is used by the system controller on a node to store copies of assets that the controller has copied from other nodes. It is entirely controlled by the system services running on that node. UAMs also provide a consistent interface between the virtual collection and various types of real asset storage. Adding new types of UAMs makes the system extensible to future types of asset storage media.

More specifically, User Asset Managers are responsible for feeding asset data into the user's asset management virtual collection. A UAM typically includes a file sniffer or some other way of detecting adds, deletes, and changes to assets in the directories it manages. When a UAM detects a change to an asset it sends a message to the node controller. The node controller reacts to the message by starting a workflow. For a newly discovered asset this workflow determines whether the asset is new or is a duplicate of an existing asset. For a new asset the workflow extracts whatever metadata is contained within the asset file, creates a thumbnail of the asset, and stores all metadata about the asset in the metadata store. The workflow which causes the creation of the thumbnail can also cause the creation of several thumbnails at different resolutions. Whether the workflow does this depends on the workflow policies implemented on the respective node.

Thumbnail Asset Managers manage the thumbnails stored by a node. Some of these thumbnails may have been generated locally and moved into the thumbnail cache by the workflow governing the discovery of new assets; others are moved into the thumbnail cache by the workflows controlling metadata synchronization with other nodes. When a user removes an asset, the workflow controlling asset removal removes the thumbnail.

Cache asset managers control temporary storage on the node. The Cache Asset Manager manages assets in the local Heavy Asset Cache 14. This temporary storage includes assets from other nodes that have been copied to the node and are being stored there temporarily. The Cache Asset Manager keeps track of the asset copies in the local cache and will remove them, as needed, to manage disk space quotas for the cache. Workflow policies control removal of assets from the cache. For example, assets that have been modified are not removed until the changes have been applied to at least one other replica of the asset via synchronization or via a local workflow if a local replica exists. For another example, "popular" assets (i.e., assets which are shared with many other users) may be retained in cache preferentially over less popular assets.

Similarly, assets that are in high demand (i.e., assets which users access frequently) can be preferentially retained. In another example, assets determined to be at higher risk of being lost (e.g., fewer backup copies, stored on a device with lower storage reliability like a cell phone) can be retained preferentially over assets which are determined to be at a lower risk (e.g. backup copies stored on a reliable online service). The workflows which remove assets from the cache can vary from one node to another. If the CAM detects a change that has been made to an asset in its cache, it notifies the workflow manager. The workflow manager then initiates the appropriate steps to deal with this modification.

The heavy asset cache 14 is initially empty. Heavy assets are added to it when a workflow requires that a copy of an asset stored on another node also be stored locally. There are a number of reasons why a copy of an asset might be stored in the cache. One reason is that an application on some node wants to access an asset whose replicas are all on other nodes. In that case, the node controller 15 will move the asset to the local cache and then give the application access to the new local replica. More interesting reasons for using the heavy asset cache 14 involve considerations of convenience, performance, safety, or availability. Some assets are more important to users than others. A person might mark the asset as important. Alternatively, its importance can be derived from a record of user action involving this asset or from an analysis of the asset's content. In either case, the importance of the asset, for example, a particular picture becomes a metadata property of that picture. If a user has indicated that the asset should be made safe from accidental deletion, the distributed system can make sure that there are replicas of the asset in more than one place. If the only copy of an important asset is on a machine that is only online intermittently, the distributed system herein can move the important asset to a node that is online more reliably, or to the central node 5, which is online all the time. In these cases, the selected picture would be moved to heavy asset caches on other nodes. It is even possible that workflow policies on a node would direct that a copy of the asset be moved into user controlled storage on another node. Again, workflows control the movement of these assets. The workflows can be initiated by user activity communicated through the system's API, and can also be initiated by synchronization commands, since the completion of a synchronization cycle indicates that the status of a user's collection has changed. In order to facilitate these workflows, there is node availability metadata associated with each node. This node availability metadata is shared with other nodes the node is in contact with. Node availability metadata allows a node to know whether assets should be pushed to another node for availability reasons.

The system stores copies of system member data (replicas) on system nodes, which may be on- or off-line at any particular time. The system gives each node a means to reconcile its data with the data on other nodes, so that the distributed system as a whole is in a self-consistent state. The system enables members to work with their collections whether or not they are currently on-line. This means that data can change on nodes at times when it is not possible to update the other nodes. It is also possible for different copies of the same data to have different changes applied. Synchronization is the process the system uses to bring member data among all the system nodes to a coherent state by reconciling differences between copies of the same data that could exist at different nodes.

System data is different from many conventional replication systems in that different nodes may store more or less information about each asset. (Conventional synchronization mechanisms are designed for full replicas where all data is replicated on all nodes.) As used here, a "less capable node" implies a node that does not store all metadata. While all nodes store at least some metadata, any number of heavy assets may or may not be present on any node. In the present invention, the implementation of system synchronization supports both metadata and heavy asset synchronization with a single mechanism.

When two nodes have different versions of the same data, it might be true for three different reasons. The first node might have a more recent version of the data; the second node might have a more recent version of the data; or both nodes might have equally recent, but different, versions of the data, because users on each node changed the same data, since the last time the nodes synchronized. The last possibility is particularly likely on the system, since it allows nodes to operate offline so that they cannot be always be synchronized. In order to allow the system to determine efficiently which possibility has occurred, the system uses version vectors. Version vectors and change lists are the means by which the system tracks revisions of replicas and system data on system nodes and are the primary mechanism for determining whether or not synchronization is needed.

A system change is a set of one or more changes made to system data on a single node to which the system assigns a sequential version number. Examples of system changes include changing the title of a photograph, incorporating multiple edits from an application, and adding multiple assets discovered by a system user or asset manager. More than one system change can occur between sync operations. Multiple system changes are kept in a system Change List. In addition to storing its own changes in a system Change list, each node stores copies of the changes it has received from other nodes during synchronization. The highest version number from all system changes for a specific node is stored in the node's element of its respective version vector. System version vectors explicitly track changes to metadata and implicitly track changes to heavy asset replicas. A version vector 30 (shown in FIG. 3a) is an array that contains an element 31 for each node. In one exemplary implementation, each system node that stores metadata or assets will have only one version vector for each system member who has data on the node. Therefore, the version vector will contain one element for each node on which the system member stores data.

In an exemplary embodiment the version vectors only describe nodes which have ever made changes to their associated metadata. The system uses a top-level version vector, along with system change lists to track and synchronize system member data across all system member nodes. Each version vector element 31 contains a synchronization ID 32 (for example, "A" in FIG. 3a) corresponding to a user for a specific node along with a counter 33 (for example, "9" in FIG. 3a) (i.e., the "logical revision) that the software increments each time the data at that node for that user changes. A given node keeps the same synchronization ID for a user's systemdata, unless it loses its data base and has to be updated completely, or unless it can't support normal synchronization, because other nodes no longer have copies of changes it needs in their change list. The version vector for a particular member/node includes current revision information for that member/node and the revision information for other nodes used by that member as of the last time synchronization occurred. There is an additional version vector for each shared part of a collection on each node.

Synchronization takes place between at least a pair of nodes. A synchronization cycle ("sync cycle") happens when a predetermined number of changes have happened on a node, since its last synchronization cycle, or when a predetermined amount of time has passed since the last sync cycle. When that happens on a node, the node compares its version vector for a user to copies of the version vectors for that user it had previously received from the user's other nodes; and determines which of those other nodes are at a lower revision level than it is and, therefore, need to be updated with its data. The node sends those other nodes a "sync cycle required" message. Nodes which have received this message begin a sync cycle with the node that sent the "sync cycle required" message. The sync cycle begins with one node, the "requestor", sending its version vector to another node, the "source". The source compares its version numbers in the requestor's and its version vectors. The goal is for the source to send to the requestor all changes (that the requester wants, based on its capability level) that have occurred on the source since it last synced with the requestor. If a comparison of version vectors shows that the source should send changes to the destination, the source looks at its change list to see which changes need to be sent to the requestor given the values of the revision levels in the version vectors. Once a sync cycle is completed, the requester updates its version vector to reflect its new change level, and then responds to other sync cycle required messages it has received.

FIGS. 5, 6, 7, 8 show the steps in a synchronization cycle for nodes having different combinations of node capabilities. These steps are preferably performed by a processor, computer, or application specific integrated circuits (ASICs). The steps can comprise a computer program that can be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 5:
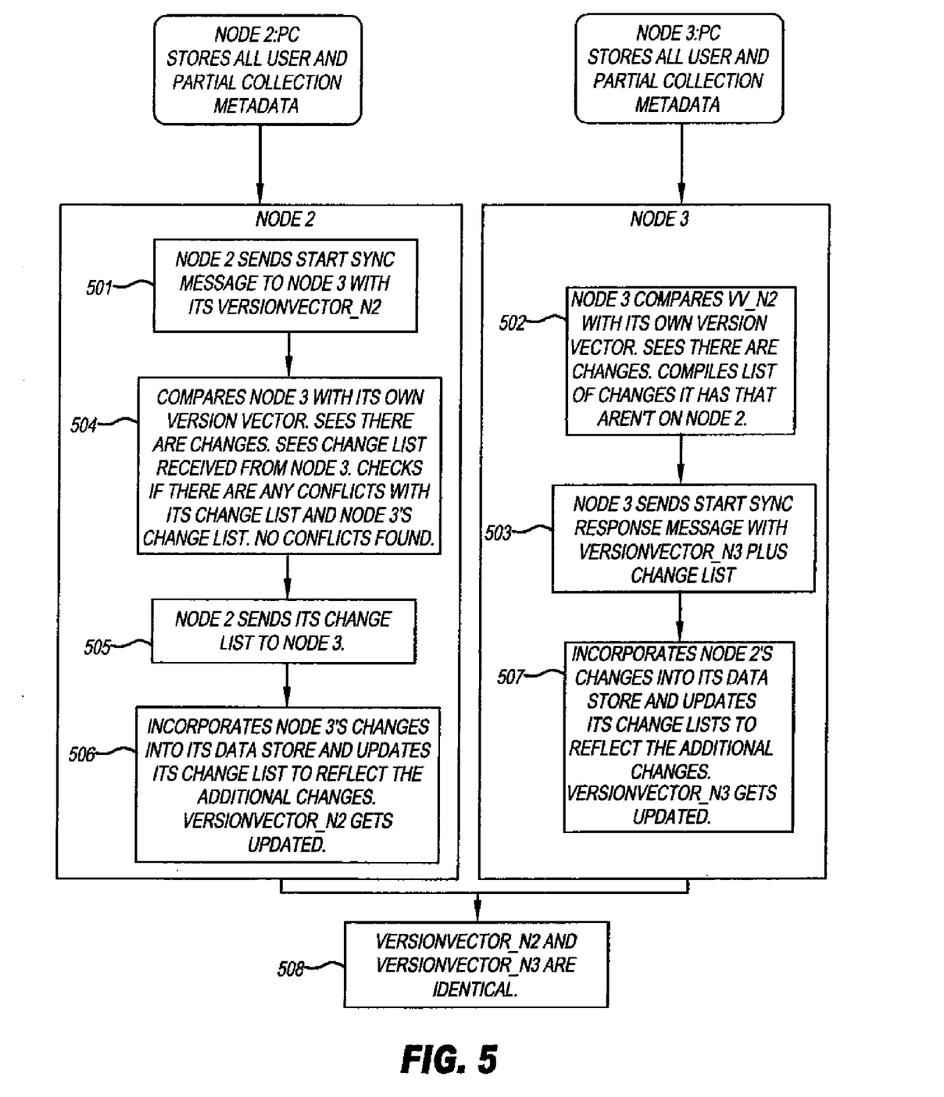
FIG. 5 shows exemplary steps in synchronizing nodes that store the same metadata.

In each case, a sync cycle starts with an exchange of version vectors. In FIG. 5, the version vectors are identical, and so no further processing occurs. Specifically, in step 501, describing an interchange between node 2 and node 3, node 2 sends a Start Sync message to node 3 with it version vector_N2(VV_N2). In step 502, node 3 compares VV_N2 with its own version vector. As a result of the comparison, node 3 detects changes and compiles a list of changes it has that aren't on node 2. Step 503 has node 3 sending Start Sync response message with VV_N3 plus the change list.

In step 504, node 2 compares node 3 with its own version vector. As a result of the comparison, node 2 detects changes and sees the change list sent by node 3. Node 2, subsequently, checks if there are any conflicts with its change list and node 3's change list. In this example, there are no conflicts found. Step 505 has node 2 sending its change list to node 3. During step 506, node 2 incorporates node 3's changes in its data store and updates its change lists to reflect the additional changes. Additionally, VV_N2 gets updated. Likewise, in step 507, node 3 incorporates node 2's changes in its data store and updates its change lists to reflect the additional changes; and VV_N3 gets updated. In this example, in the final step 508, VV_N2 and VV_N3 are identical.

Figure 6:
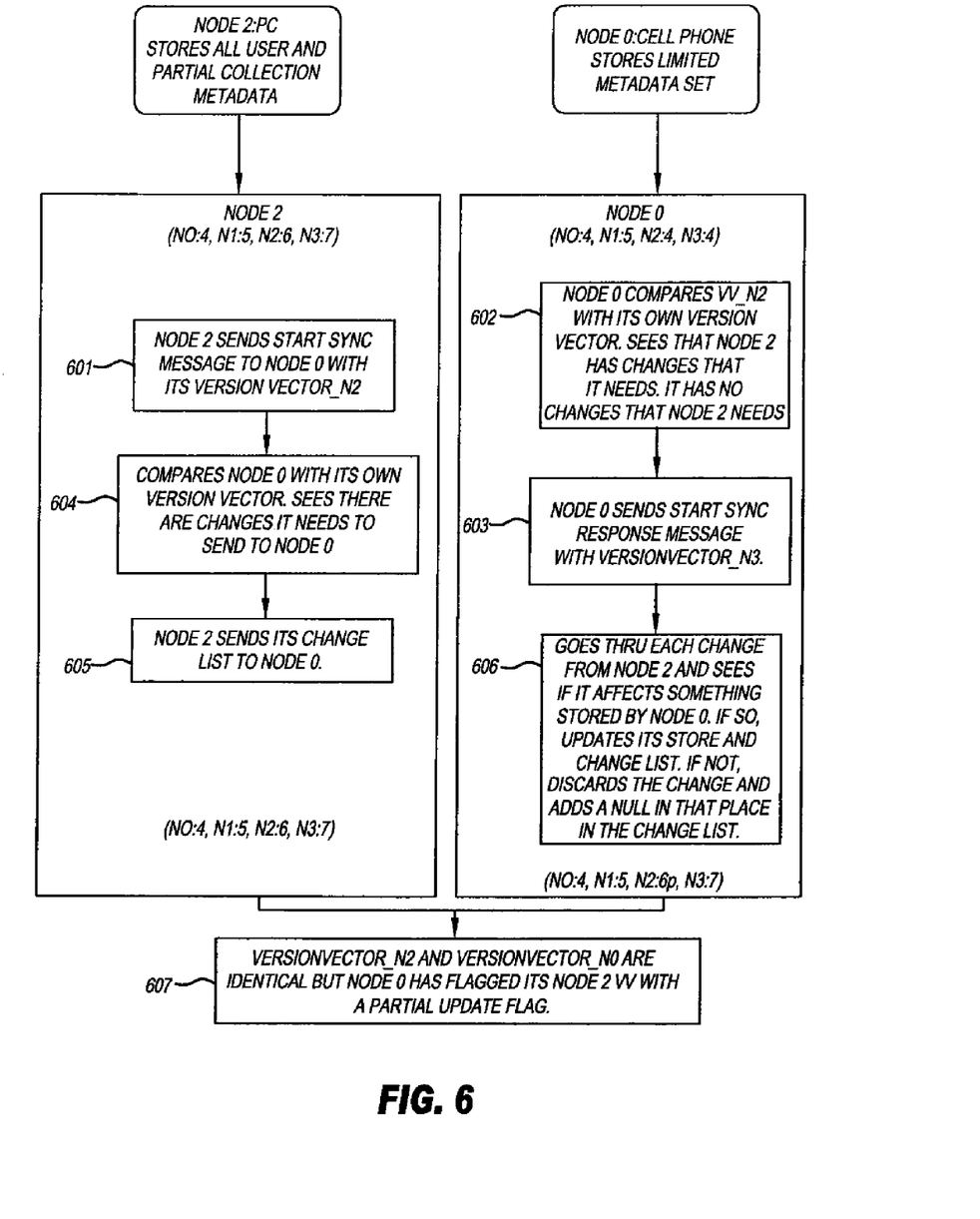
FIG. 6 shows exemplary steps in synchronizing nodes with differing metadata levels (more capable to less capable).

In FIG. 6, one node (node 0) detects from the version vector that two nodes (node 0, node 2) need to be synchronized. The nodes exchange change lists, use the change lists to determine which metadata needs to be updated, and exchange whatever metadata is required to bring the two nodes into synchronization. Notably, in step 601 node 2 sends Start Sync message to node 0 with its version vector_N2 (VV_N2). Step 602 is where node 0 compares VV_N2 with its own version vector. Accordingly, node 0 sees that node 2 has changes that node 0 will need, but node 0 has no changes that node 2 needs. In step 603, node 0 sends Start Sync response message with VV_N3. Thereafter, in step 604, node 2 compares node 0 with its own version vector. Node 2 sees or detects that there are changes that will need to be sent to node 0. Accordingly, in step 605, node 2 sends its change list to node 0.

During step 606, node 0 examines and evaluates each change from node 2 and determines if it affects anything stored by node 0. If there is an impact upon a stored asset, node 0 updates its store and change list. If there is no impact upon a stored asset, node 0 discards the change and adds a null as a placeholder within the change list. In the final step, step 607, VV_N2 and VV_N0 are identical, but node 0 has flagged its version vector with a partial update flag.

Figure 7:
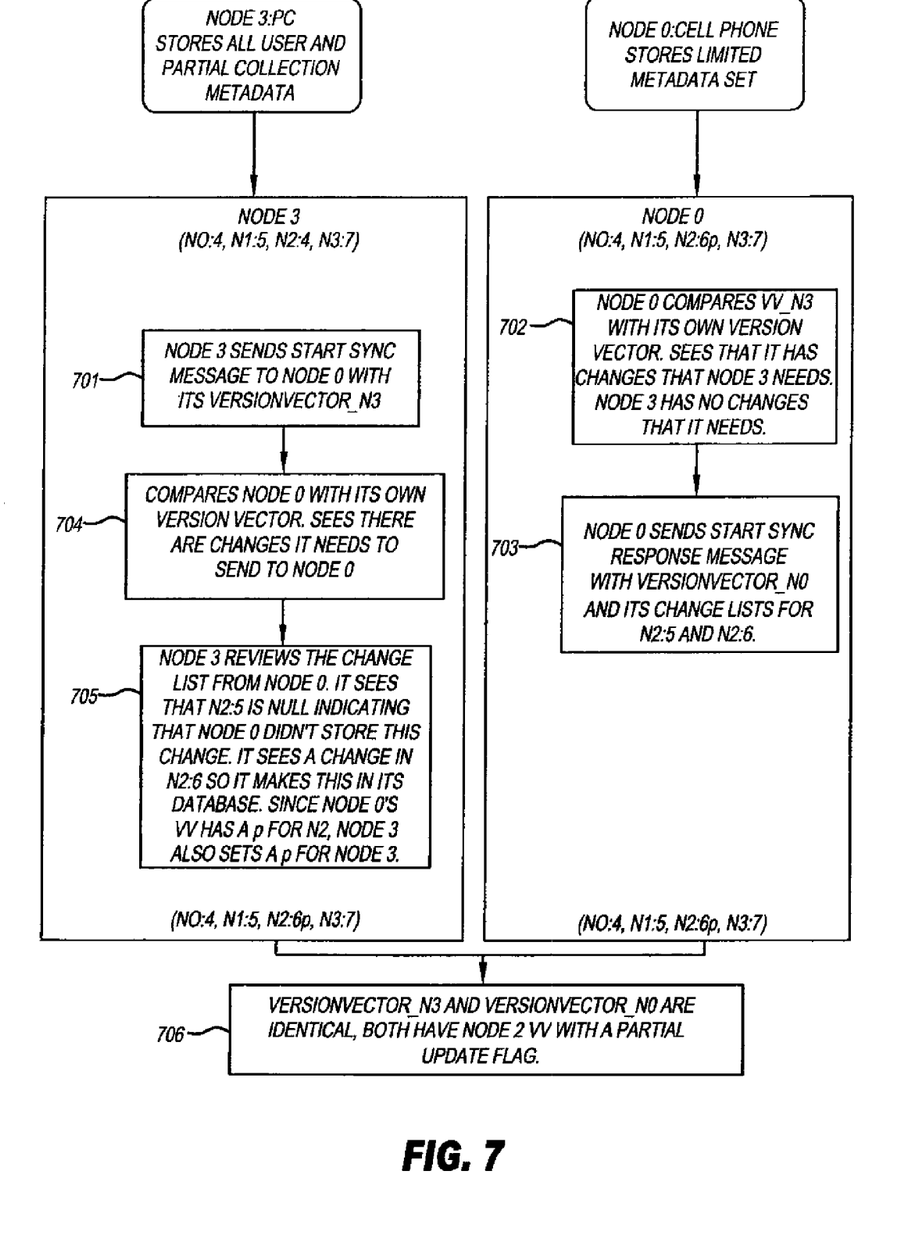
FIG. 7 shows exemplary steps in synchronizing nodes with differing metadata levels (less capable to more capable).
Figure 8:
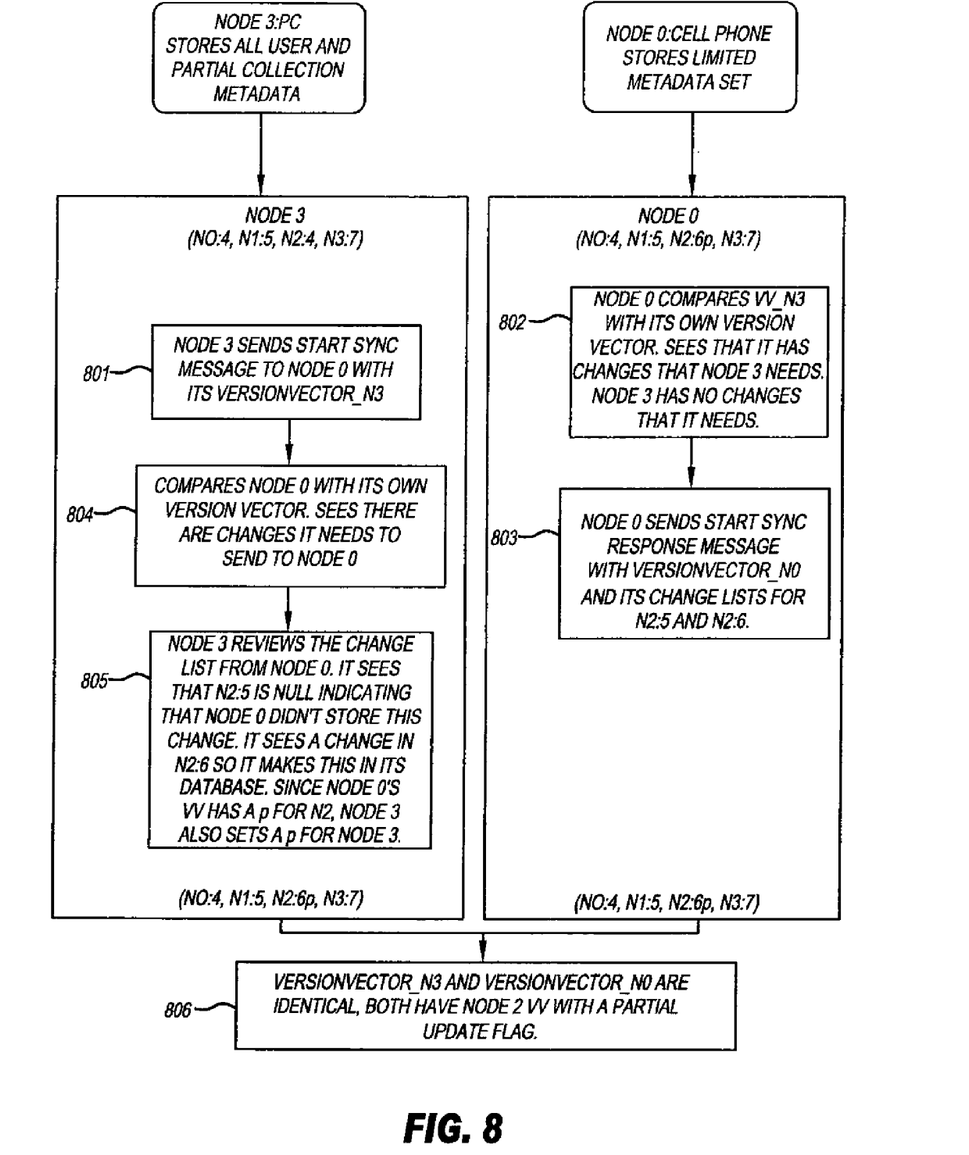
FIG. 8 shows exemplary steps in synchronizing nodes with same metadata levels (filling in partial sync).

In FIG. 7 and FIG. 8, one node is less capable than the other, i.e., the node does not contain all metadata. The node located on the cell phone is less capable than the node located on the desktop PC, because the cell phone is not able to store as much metadata for each asset as the desktop PC. The capability data for the cell phone contains a description of which types of metadata the cell phone node does not store. The figures differ in whether the more capable or the less capable node has initiated the sync cycle. The process differs from the process for equally capable nodes in that the less capable node does not update all of its data. The figure also shows the version vectors before and after the sync cycle has taken place. These version vectors are in parentheses. The notation indicates all other nodes known to the node in question, which version level each of those nodes are at, and whether any of those nodes have been updated partially.

Specifically, for the exemplary embodiment shown in FIG. 7, step 701 has node 3 sending Start Sync message to node 0 with its VV_N3. Step 702 has node 0 comparing VV_N3 with its own version vector. Node 0 detects that it has changes that node 3 needs. Node 3 has no changes that it needs. In step 703 node 0 sends Start Sync response message with VV_N0 and its change lists for placement at N2:5 and N2:6 of its version vector. In step 704 node 3 compares node 0 with its own version vector. Node 3 sees there are changes it needs to send node 0.

In step 705, node 3 reviews the change list from node 0. Node 0 sees that place N2:5 has a null indicating that node 0 didn't store a change. Additionally, node 3 sees a change in N2:6 so the database for node 3 is updated. Notably, node 0's version vector has a "p" for N2, therefore, node 3 also sets a "I" for node 3. In the step 706, VV_N3 and VV_N0 are identical and both have node 2 version vector, VV with a partial update flag.

In the exemplary embodiment shown in FIG. 8, step 801 illustrates node 3 sending a Start Sync message to node 0 with its VV_N3. In step 802, node 0 compares VV_N3 with its own version vector to detect changes that node 3 needs. In this example, node 3 doesn't have any changes that it needs. Subsequently, in step 804 node 3 compares node 0 with its own version vector to detect if there are any changes it needs to send to node 0. Step 805 has node 3 reviewing the change list from node 0. At N2:5 there is a null indicating that node 0 didn't store a change. A change is seen at N2:6, therefore, the corresponding database is updated. Since node0's version vector has a "p" for N2, node 3 also sets a "p" for node 3. The final step of 806 has version vectors VV_N3 and VV_N0, as identical and both have node 2 version vector, VV with a partial update flag.

A sync cycle for shared data is implemented in a slightly different fashion. If a node on which a first user has an account includes data that has been shared with another user, it will have a version vector corresponding to the shared data. If the shared data changes on a specific node for the first user, the node will initiate a sync cycle with another node that has an account for the second user. After the second user's node is synchronized, it will synchronize itself with other nodes containing accounts for the second user using the normal synchronization process.

Because change lists grow over time, they sometimes need to be pruned. If all nodes were online all the time pruning would be easy—as soon as a given change had been propagated to all other nodes its change list item would no longer be needed and could be deleted. In fact, as pairs of nodes become synchronized, the system as a whole does become substantially synchronized, since a substantial proportion of the nodes are synchronized with each other. The exception is the offline nodes, which cannot be synchronized until they come online. If a node is offline for a predetermined long amount of time, other nodes will not wait for it to receive their changes, but will delete change list items for changes which have been propagated to all other, non-missing nodes. This deletion process is termed pruning. Once the missing node comes back online, it will once again participate in sync cycles with other nodes. Those sync cycles will not be able to proceed normally, because the other nodes will no longer have change list items corresponding to changes that occurred on those nodes after the node had gone offline, because of the pruning that had occurred. Therefore, the formerly missing node subsequently participates in a modified sync cycle. First, it sends the changes it made while offline to a second node. All these offline changes are assumed to be potentially in conflict and a user is asked to determine if these changes should be accepted. Then after the conflicts have been resolved, the formerly-offline node updates its entire metadata store and change list from the same second node it sent its changes to. A simpler example of this is when a new node comes on-line and all other nodes have already pruned their change lists. The new node will update its entire metadata store from another node. Notably, in this case the new node would very likely not have any changes.

Sharing in digital asset management means that other users (sometimes called, "share recipients") are able to access digital assets within a user's collection. The amount of access the other users have is under the control of the user who owns the asset. A share recipient who is only partly trusted might be granted read access to some of the metadata for the asset, while a fully trusted share recipient can be given the right to modify the asset itself. Shares are initiated or offered by one user and directed to another user. The second user is messaged with a share invitation and allowed to accept or reject the share invitation, which generates a response message back. This messaging uses the same peer-to-peer network as other inter-node communications. If the share invitation was accepted, it also initiates a workflow that adds information about the shared asset to the metadata and the tracking of the shared asset by the offering user. Again, the owner of the shared asset controls how much access is granted to the share recipient with respect to the shared asset. In an exemplary embodiment of this system, the sharer assigns a role to each share recipient. This assigned role, along with the identity of the share recipient, is stored in the metadata store 16 for the sharer. The node controller 15 uses this assigned role to determine whether to allow the share recipient to read or alter the shared asset.

In order to share an asset with a second user the offering user first needs to put the second user on his contact list. Any node in the systemnetwork can find out whether other users are available by asking the central node 5, since all users are in contact with it. If the central node 5 is not available, a node can at least ask the nodes it is in contact with for their users. Once a systemmember has obtained a list of potential contacts, the member can select a user to be sent a message inviting that user to be a contact. The message, like other user messages is sent to at least one node known to contain an account for the addressee of the message and is propagated via the synchronization process to other nodes containing that user Once the second user has been made a contact, the offering user can share assets with it. The offering user sends a user message to the potential share recipient inviting the share recipient to share the selected assets. Once the share recipient accepts the invitation to share, the node that the share recipient is working at will ask one of the offering user's node for metadata describing the asset and add that metadata to its collection metadata with additional attributes indicating that it is shared.

Figure 3:
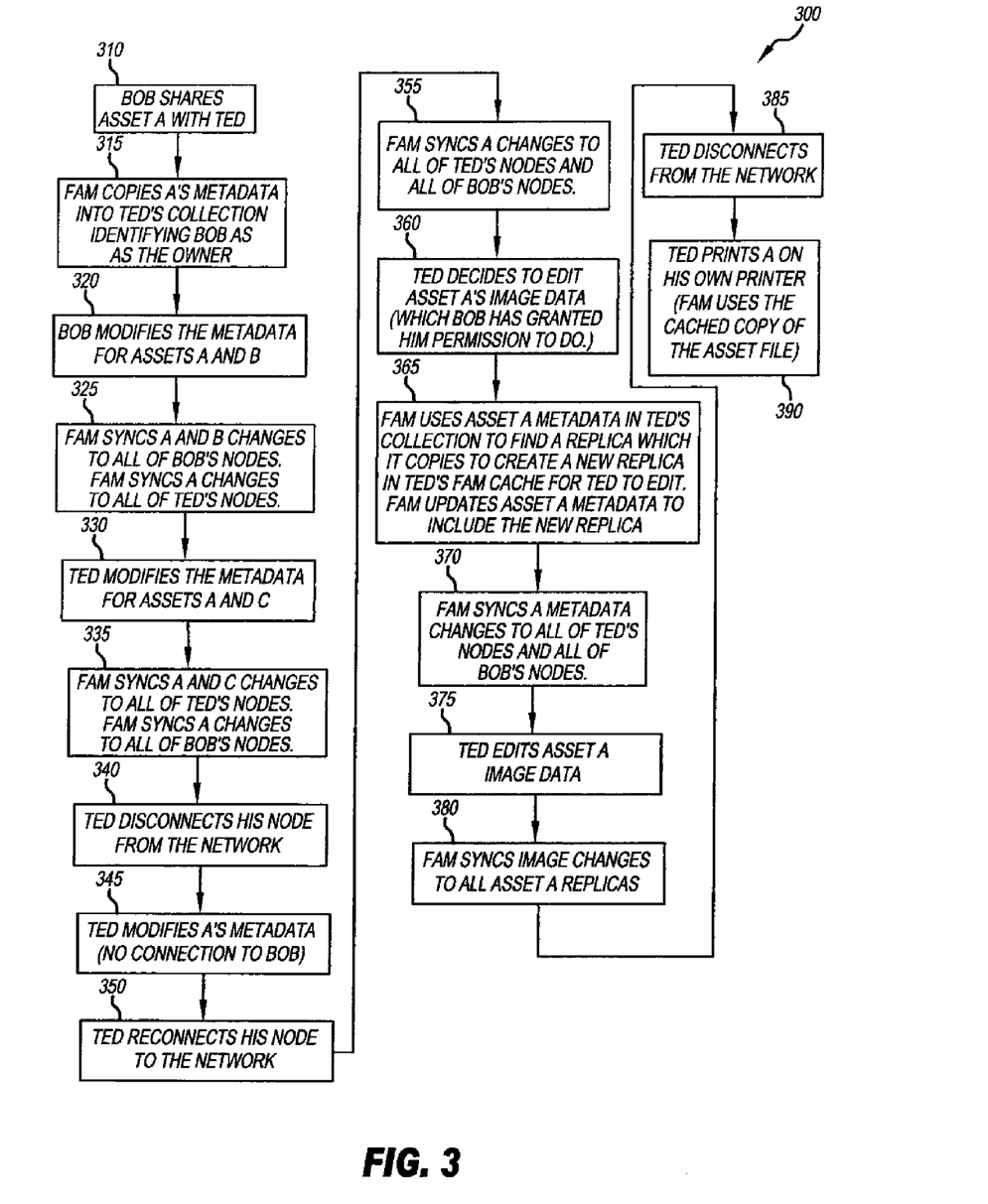
FIG. 3 shows exemplary steps in sharing an asset between users and synchronizing changes in that asset.
Figure 3A:
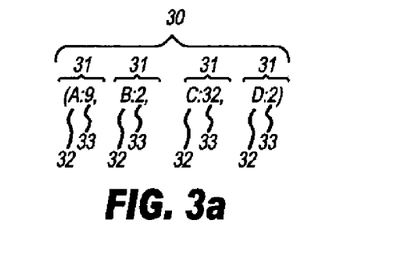
FIG. 3a shows the components of a version vector.

FIG. 3 shows the steps involved in synchronizing shared assets in an illustrative flowchart 300 involving "Bob" and "Ted". These steps are preferably performed by a processor, computer, or application specific integrated circuits (ASICs). The steps can comprise a computer program that can be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Initial step 310, Bob shares asset "A" with Ted. Step 315, the system copies shared asset A's metadata into Ted's collection and identifies Bob as the owner. Step 320, Bob modifies the metadata for assets A and B. Step 325 system synchronizes the changes for assets A and B to all of Bob's nodes. In addition, the system synchronizes (i.e., 'synchs') the changes for asset A to all of Ted's nodes. Step 330 Ted modifies the metadata for assets A and C.

In step 335, system synchs A and C changes to all of Ted's nodes, while also synching changes involving asset A to all of Bob's nodes. Step 340 Ted disconnects his node from the distributed system, (i.e., goes off-line). In step 345, Ted modifies asset A's metadata while being disconnected from Bob. Subsequently, in step 350, Ted reconnects his node to the distributed system. Step 355, the system synchs A's changes to all of Ted's nodes and all of Bob's nodes.

In step 360, Ted decides to edit asset A's image data (which Bob has granted Ted permission to do so). Step 365, the systemuses asset A's metadata in Ted's virtual collection to find a replica and copies it to create a new replica in Ted's system cache for Ted to edit. The system updates asset A's metadata to include the newly created replica. Step 370, the system syncs A's metadata changes to all of Ted's nodes and all of Bob's nodes.

In step 375, Ted edits asset A's image data. Step 380, the system syncs image changes to all of asset A's replicas. In step 385, Ted, again, disconnects from the distributed system. In a final step, step 390, Ted prints the image data from asset A on his own printer (system uses the cached copy of the asset file).

Figure 4:
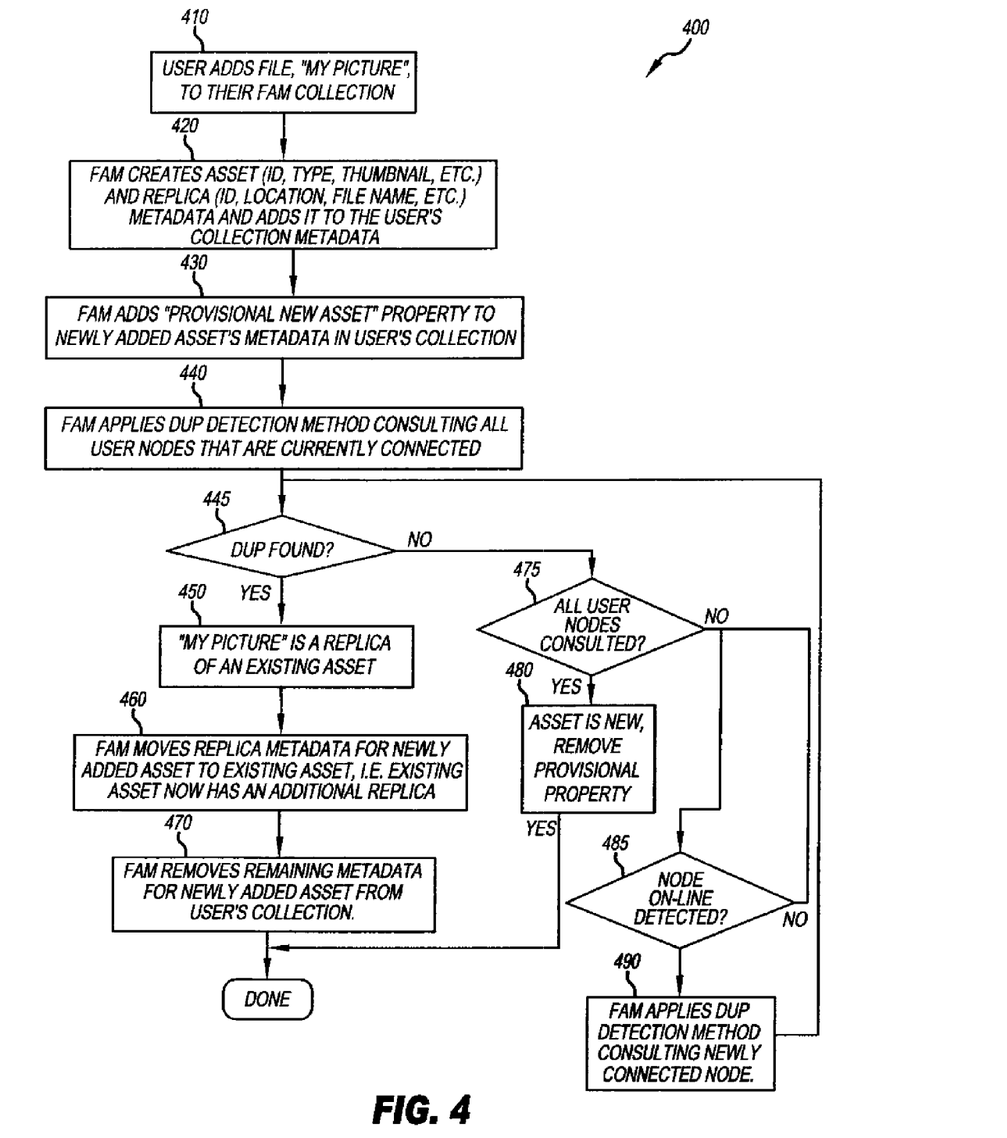
FIG. 4 shows exemplary steps in duplicate detection with disconnected nodes.

In a further feature of the present invention, when a UAM on a node detects a new asset, the system needs to determine if it is an entirely new asset or a copy of an asset which is already known to the system. If the asset is a copy of an asset already known to the system, the distributed system can categorize the asset file as a replica of an existing asset, rather than as a new asset. There are known means for detecting whether the asset is unique in the case where the node already contains metadata for that asset. However, because the distributed system described herein can be used by nodes that are offline, it is possible that two nodes, not in contact with each other, could both add the same asset, so that the duplication cannot be detected, until after both duplicates have been independently added to the collection databases. When the nodes come into contact, there needs to be an efficient means to determine if any assets need to be identified as duplicates among the nodes. The distributed system of the present invention solves the identification of duplicates problem by recording new assets discovered by an offline node as "provisional new assets". The distributed system does this by assigning a type of asset metadata termed the "provisional new asset property" to newly discovered assets on offline nodes. The provisional new asset property provides an unambiguous indicator that duplicate checking has not been completed for the asset and still needs to occur. FIG. 4 shows illustrative steps in assigning and using the provisional new asset property within exemplary flowchart 400 and a file labeled, "My Picture".

These steps are preferably performed by a processor, computer, or application specific integrated circuits (ASICs). The steps can comprise a computer program that can be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

In Step 410 a user adds file, "My Picture" to their system virtual collection. Step 420, the system creates asset (ID, type, thumbnail, etc.) and replica (ID, type, thumbnail, etc.) metadata and adds it to the user's virtual collection metadata. Step 430, the system adds "provisional new asset" property to newly added asset's metadata in user's collection. Step 440, the system applies duplicate detection method by consulting all user nodes that are currently connected.

An inquiry is conducted in step 445 to determine whether any duplicates have been found. If a duplicate has been found, step 450 labels "My Picture" as a replica of an existing asset. Step 460 causes system to move replica metadata for newly added asset to existing asset. In other words, the existing asset gains an additional replica. In step 470, system removes remaining metadata for newly added asset from user's collection before completing the workflow.

Otherwise, if no duplicate was found, when the node reconnects, an additional inquiry in step 475 consults all the user's nodes for duplicates. If all the user's nodes have been consulted, then the asset is considered new and the provisional property designation is removed in step 480 before completing the workflow.

When all the user nodes have not been consulted, an additional inquiry in step 485 determines whether the particular node is on-line and continues to poll for on-line status. Step 490 causes system to apply duplicate detection method when consulting newly connected nodes for duplicates during a repetitive cycle.

An alternative method for detecting duplicate assets when nodes which had been offline come into contact is as follows. When nodes come into contact, they will synchronize their metadata. This process will cause assets added on one node to be added to the metadata of the other node. Because the synchronization of two nodes involves an exchange of asset change lists between those nodes, and because the change list for a node can indicate which assets are new, the need to perform duplicate checking for a particular asset could be inferred from the asset change lists exchanged during synchronization.

The invention has been described in detail with particular reference to certain preferred embodiments thereof, but it will be understood that variations and modifications can be effected within the spirit and scope of the invention.

PARTS LIST 1 node
2 peer-to-peer link
3 applications
5 central node
10 components which communicate
11 API component
12 network interface
13 storage component
14 asset cache
15 node controller
16 metadata store
17 node data base
18 thumbnail cache
30 version vector
31 version vector element
32 synchronization ID
33 version counter
300 flowchart
310 initial step
315 step
320 step
325 step
330 step
335 step
330 step
335 step
340 step
345 step
350 step
355 step
360 step
365 step
370 step
375 step
380 step
385 step
390 step
501 step
502 step
503 step
504 step
505 step
506 step
507 step
508 step
601 step
602 step
603 step
604 step
605 step
606 step
607 step
701 step
702 step
703 step
704 step
705 step
706 step
801 step
802 step
803 step
804 step
805 step
806 step

The invention claimed is:

1. A system for managing distributed digital assets and related metadata in a network, comprising:

a plurality of processor-based interconnected nodes, wherein each of the interconnected nodes comprises a memory storing one or more software services, each of the interconnected nodes providing accessibility to the distributed digital assets via user controlled storage components and caching subsystems such that the management of the distributed digital assets and related metadata is based on predetermined criteria;

wherein the predetermined criteria include an asset safety value related to the number of accessible replicate copies of the distributed digital assets and at least one of: node availability, node capability, asset popularity and demand, asset availability priority requirements, an asset importance value derived from a record of user actions involving the distributed digital assets, or an asset importance value determined by automatically analyzing the content of the distributed digital assets; and wherein each node in the plurality of interconnected nodes includes a caching subsystem for caching the distributed digital assets, a metadata storage component, a controller, a user-controlled asset component, a networking subsystem for communication between each of the nodes, and wherein the plurality of interconnected nodes provide support for platform operation of client applications.

2. The system of claim 1, wherein each of the plurality of interconnected nodes have independently configurable policies that govern tasks performed by the node.

3. The system claimed in claim 2, wherein the management of the related metadata further comprises synchronizing one or more nodes so that the related metadata is reconciled according to the predetermined criteria that governs behavior associated with each of the interconnected nodes, independently.

4. The system claimed in claim 2, wherein the management of the distributed digital assets further comprises synchronizing one or more nodes so that the distributed digital assets are reconciled according to the predetermined criteria that govern behavior associated with each of the interconnected nodes, independently.

5. The system claimed in claim 1, wherein the controller provides an application program interface (API) for the client applications to access and manage the distributed digital assets and related metadata.

6. The system claimed in claim 1, wherein synchronization among one or more interconnected nodes is initiated as a result of changes to at least one node.

7. The system claimed in claim 1, wherein a node that has been offline for a predetermined amount of time updates itself with new metadata when the node comes back online.

8. A system for managing distributed digital assets and related metadata in a network, comprising:
   a plurality of processor-based interconnected nodes, wherein each of the interconnected nodes comprises a memory storing one or more software services, each of the interconnected nodes providing accessibility to the distributed digital assets via user controlled storage components and caching subsystems such that the management of the distributed digital assets and related metadata is based on predetermined criteria;
   wherein the predetermined criteria include an asset importance value determined by automatically analyzing the content of the distributed digital assets and at least one of: node availability, node capability, asset popularity and demand, asset availability priority requirements, an asset importance value derived from a record of user actions involving the distributed digital assets, or an asset safety value related to the number of accessible replicate copies of the distributed digital assets; and
   wherein each node in the plurality of interconnected nodes includes a caching subsystem for caching the distributed digital assets, a metadata storage component, a controller, a user-controlled asset component, a networking subsystem for communication between each of the nodes, and wherein the plurality of interconnected nodes provide support for platform operation of client applications.

* * * * *